(12) United States Patent
Hirai et al.

(10) Patent No.: US 9,259,898 B2
(45) Date of Patent: Feb. 16, 2016

(54) TRANSPARENT LAMINATE, WINDOW PANEL FOR DISPLAY DEVICE AND DISPLAY DEVICE INCLUDING THE WINDOW PANEL

(71) Applicant: Samsung Display Co., Ltd., Yongin (KR)

(72) Inventors: Akira Hirai, Yongin (KR); Dong-Ho Lee, Yongin (KR); Kyu-Taek Lee, Yongin (KR); Sang-Woo Han, Yongin (KR); Sang-Gu Kim, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 393 days.

(21) Appl. No.: 13/706,852

(22) Filed: Dec. 6, 2012

(65) Prior Publication Data

US 2013/0177748 A1    Jul. 11, 2013

(30) Foreign Application Priority Data

Jan. 9, 2012    (KR) .................. 10-2012-0002634

(51) Int. Cl.
| | |
|---|---|
| *B32B 3/10* | (2006.01) |
| *B32B 7/02* | (2006.01) |
| *B32B 27/28* | (2006.01) |
| *B32B 27/08* | (2006.01) |

(52) U.S. Cl.
CPC . *B32B 7/02* (2013.01); *B32B 27/08* (2013.01); *B32B 27/283* (2013.01); *B32B 2255/20* (2013.01); *B32B 2255/26* (2013.01); *B32B 2255/28* (2013.01); *B32B 2307/412* (2013.01); *B32B 2307/51* (2013.01); *B32B 2307/536* (2013.01); *B32B 2307/54* (2013.01); *Y10T 428/24802* (2015.01); *Y10T 428/24868* (2015.01); *Y10T 428/24967* (2015.01); *Y10T 428/24983* (2015.01)

(58) Field of Classification Search
CPC ........................................................ B32B 7/02
See application file for complete search history.

(56) References Cited

U.S. PATENT DOCUMENTS

| | | | |
|---|---|---|---|
| 6,252,703 | B1 | 6/2001 | Nakamura et al. |
| 6,896,960 | B2 * | 5/2005 | Shoshi et al. .............. 428/323 |
| 2003/0176124 | A1 | 9/2003 | Koike et al. |
| 2004/0151895 | A1 | 8/2004 | Itoh et al. |
| 2007/0181456 | A1 * | 8/2007 | Kusuda et al. ............. 206/443 |

FOREIGN PATENT DOCUMENTS

| | | |
|---|---|---|
| CN | 1462237 A | 12/2003 |
| CN | 1493889 A | 5/2004 |
| CN | 1902571 A | 1/2007 |
| CN | 101490768 A | 7/2009 |
| JP | 2006-155452 A | 6/2006 |
| KR | 10-0540543 B1 | 12/2005 |
| KR | 10-0944920 B1 | 2/2010 |

* cited by examiner

*Primary Examiner* — Bruce H Hess
*Assistant Examiner* — Christopher Polley
(74) *Attorney, Agent, or Firm* — Knobbe Martens Olson & Bear, LLP

(57) ABSTRACT

In one aspect, a transparent laminate, including a transparent material layer, a transparent high-elasticity layer laminated on both sides of the transparent material layer and having Young's modulus of less than or equal to about 10 MPa, and a transparent high-hardness layer sequentially laminated on the transparent high-elasticity layer that is laminated on both sides of the transparent material layer and having a surface hardness of greater than or equal to a pencil hardness of about 6H is provided.

20 Claims, 4 Drawing Sheets

TRANSPARENT LAMINATE, WINDOW PANEL FOR DISPLAY DEVICE AND DISPLAY DEVICE INCLUDING THE WINDOW PANEL

CROSS-REFERENCE TO RELATED APPLICATIONS

This application claims priority to and the benefit of Korean Patent Application No. 10-2012-0002634 filed in the Korean Intellectual Property Office on Jan. 9, 2012, the disclosure of which is incorporated herein by reference in its entirety.

BACKGROUND

1. Field

The present disclosure relates to a transparent laminate, a window panel for a display device, and a display device including the same.

2. Description of the Related Technology

Mobile devices such as mobile phones or tablet PCs may include a touch panel, and tempered glass may be used as a window panel for protecting the surface of their display. However, tempered glass applied to portable devices, such as mobile phone, may be broken due to external impact. Also, when tempered glass is broken the glass may be scattered. For this reason, anti-scattering film may be used. Moreover, since the specific gravity of the tempered glass is around 2.5, which is more than twice as high as typical plastic material, it is disadvantageous to use tempered glass in a thin and lightweight mobile device. Thus, including tempered glass may comparatively weight to a device due to its specific gravity.

SUMMARY

Some embodiments provide a transparent laminate that may be included in a display device to solve problems associated with tempered glass.

Some embodiments provide a window panel for a display device that is light in weight and has strength.

Some embodiments provide a display device including a window panel for a display device that is light in weight and has strength.

According to one aspect of the present embodiment, a transparent laminate includes: a transparent material layer; a transparent high-elasticity layer laminated on both sides of the transparent material layer, wherein said transparent high-elasticity layer may have a Young's modulus of less than or equal to about 10 MPa; and a transparent high-hardness layer, wherein said transparent high-hardness layer is formed on or directly on the transparent high-elasticity layer by sequentially laminating the transparent high-elasticity layer that is laminated on both sides and wherein said transparent high-hardness layer has a surface hardness of greater than or equal to a pencil hardness of about 6H.

In certain embodiments, the transparent laminate may be used for a vehicle or a window.

Some embodiments provide a window panel for a display device including: a transparent material layer; a transparent high-elasticity layer laminated on both sides of the transparent material layer wherein said transparent high-elasticity layer may have a Young's modulus of less than or equal to about 10 MPa; and a transparent high-hardness layer, wherein said transparent high-hardness layer may be formed on or directly on the transparent high-elasticity layer by sequentially laminating the transparent high-elasticity layer that is laminated on both sides and wherein said transparent high-hardness layer may have a surface hardness of greater than or equal to a pencil hardness of about 6H.

In certain embodiments, the transparent material layer may have a single layer structure of an organic material layer or an inorganic material layer; a laminating structure where a plurality of organic material layers, a plurality of inorganic material layer, or a combination of an organic material layer and an inorganic material layer may be in a laminated configuration.

In certain embodiments, the transparent material layer may have a Young's modulus of greater than or equal to about 1 GPa.

In certain embodiments, the transparent material layer may have a thickness of about 10 μm to about 2 mm.

In certain embodiments, the transparent high-elasticity layer may be an adhesive material layer.

In certain embodiments, the transparent high-elasticity layer may have a thickness of about 1 μm to about 100 μm.

In certain embodiments, the transparent high-elasticity layer that is laminated on both sides of the transparent material layer may have the same or different thickness.

In certain embodiments, the transparent high-hardness layer may have a single layer structure of a silsesquioxane layer; a laminating structure including a plastic film and a silsesquioxane layer; or a laminating structure of a plastic film one side or both sides of which is or are laminated with a hard coating layer.

In certain embodiments, the silsesquioxane layer and the hard coating layer may have a thickness of about 5 μm to about 250 μm.

In certain embodiments, the plastic film may have a thickness of about 25 μm to about 100 μm.

In certain embodiments, the hard coating layer may include an acryl-based compound, an epoxy-based compound, or an organic/inorganic composite compound. In certain embodiments, the hard coating layer may include at least one component selected from the group consisting of an acryl-based compound, an epoxy-based compound, and an organic/inorganic composite compound.

In certain embodiments, the window panel may further include: a printed unit printed on one side or both sides of the transparent material layer.

In certain embodiments, the window panel may further include: a printed unit printed on the internal surface of the transparent high-hardness layer facing the transparent material layer.

Some embodiments provide a display device including a window panel for a display device, wherein the window panel may include a transparent material layer; a transparent high-elasticity layer laminated on both sides of the transparent material layer wherein said transparent high-elasticity layer may have a Young's modulus of less than or equal to about 10 MPa; and a transparent high-hardness layer, wherein said transparent high-hardness layer may be formed on or directly on the transparent high-elasticity layer by sequentially laminating the transparent high-elasticity layer that is laminated on both sides and wherein said transparent high-hardness layer may have a surface hardness of greater than or equal to a pencil hardness of about 6H. In certain embodiments, the window panel for a display device may include a transparent material layer; a transparent high-elasticity layer laminated on both sides of the transparent material layer and having Young's modulus of less than or equal to about 10 MPa; and a transparent high-hardness layer sequentially laminated on the transparent high-elasticity layer that is laminated on both sides of the transparent material layer and having a surface hardness of greater than or equal to a pencil hardness of about 6H. In certain embodiments, the transparent material layer has a single layer structure of an organic material layer or an inorganic material layer; a laminating structure where a plurality of organic material layers, a plurality of inorganic material layer, or a combination of an organic material layer and an inorganic material layer are laminated. In certain embodiments, the transparent material layer has a Young's modulus of greater than or equal to about 1 GPa. In certain embodiments, the transparent material layer has a thickness of about 10 µm to about 2 mm. In certain embodiments, the transparent high-elasticity layer is an adhesive material layer. In certain embodiments, the transparent high-elasticity layer has a thickness of about 1 µm to about 100 µm. In certain embodiments, the transparent high-elasticity layer that is laminated on both sides of the transparent material layer has the same or different thickness. In certain embodiments, the transparent high-hardness layer has a single layer structure of a silsesquioxane layer; a laminating structure including a plastic film and a silsesquioxane layer; or a laminating structure of a plastic film one side or both sides of which is or are laminated with a hard coating layer. In certain embodiments, the silsesquioxane layer and the hard coating layer have a thickness of about 5 µm to about 250 µm. In certain embodiments, the plastic film has a thickness of about 25 µm to about 100 µm. In certain embodiments, the hard coating layer includes an acryl-based compound, an epoxy-based compound, an organic/inorganic composite compound or a combination thereof.

In certain embodiments, the window panel for a display device may have a surface hardness of high impact resistance while being thin and light in weight.

DETAILED DESCRIPTION

Figure 1:
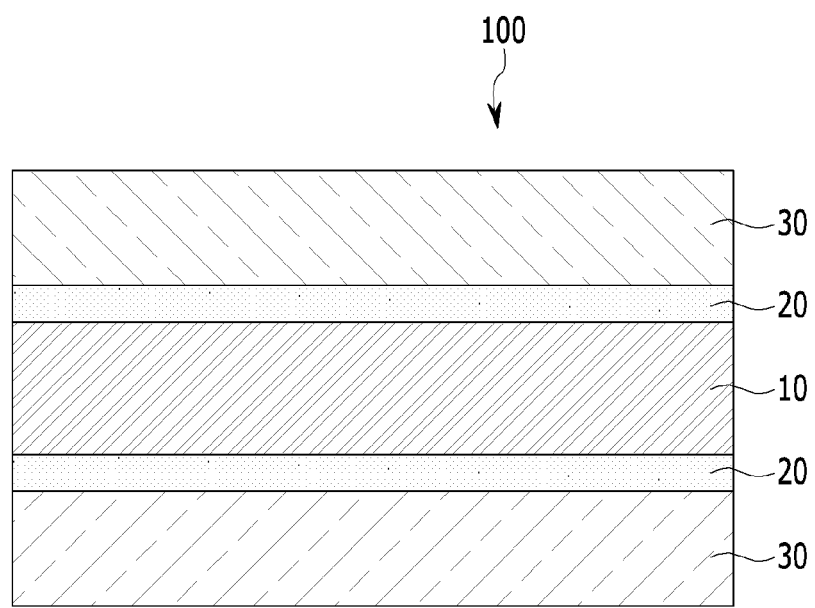
FIG. 1 is a cross-sectional view showing a transparent laminate according to one aspect of the present embodiments.

The present disclosure will be more fully described hereinafter with reference to the accompanying drawings, in which exemplary embodiments of this disclosure are shown. As those skilled in the art would realize, the described embodiments may be modified in various different ways, all without departing from the spirit or scope of this disclosure.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

DESCRIPTION OF FIGURE SYMBOLS 10, 110, 210, 310: transparent material layer
20, 120, 220, 320: transparent high-elasticity layer
30, 130, 230, 330: transparent high-hardness layer
100: laminate
131, 231, 331: plastic film
132, 232, 332: silsesquioxane layer or hard coating layer
200, 300, 400: window panel for a display device
240, 340: printed unit
311: polarizer or glass
312: plastic film FIG. 1 is a cross-sectional view showing a transparent laminate 100 according to one embodiment.

In certain embodiments, the transparent laminate 100 may include: a transparent material layer 10; transparent high-elasticity layer 20 laminated on both sides of the transparent material layer 10 and having Young's modulus of less than or equal to about 10 MPa; and a transparent high-hardness layer 30 sequentially laminated on the transparent high-elasticity layer 20 that is laminated on both sides of the transparent material layer 10 and having a surface hardness of greater than or equal to a pencil hardness of about 6 H.

In certain embodiments, the transparent laminate 100, as illustrated in FIG. 1, may have lighter and higher strength characteristics and dramatically improved impact resistance even in the same thickness, because the transparent high-elasticity layer 20 and the transparent high-hardness layer 30 are sequentially and symmetrically laminated based on the transparent material layer 10. In certain embodiments where the transparent laminate 100 has a symmetrical structure, no curling occurs, and although used alone and when the material of the transparent material layer 10 is used having poor impact resistance, the impact resistance may be greatly improved in comparison to where the transparent laminate 100 does not have a symmetrical structure.

In certain embodiments, the transparent laminate 100 may be preferably used where the usage requiring tempered glass. Particularly, it may be effectively applied not only to vehicles and windows but also a window panel for a display device that particularly requires a surface hardness of high impact resistance while being thin and light in weight.

In certain embodiments, the display device may include a liquid crystal display (LCD), a plasma display device (PDP), an organic light emitting diode (OLED) display, a field emission display (FED), an electrophoretic display device, and the like. In certain embodiments, the display device may include a display module for showing an image and a window panel for protecting the display module, and the transparent laminate 100 may be used as the window panel.

Portable devices such as mobile phones or tablet PCs to which a display device may be applied are becoming bigger, the transparent laminate 100 may be set on, or directly on, the display device as a substitution for tempered glass for protecting the surface of the display device and effectively protect the display device from external impact, or effectively protect the surface of the display device from scratches that may occur when data are inputted onto the touch panel.

According to another aspect of the present embodiments, a window panel for a display device 200 may include a transparent material layer 110; a transparent high-elasticity layer 120 laminated on both sides of the transparent material layer 110 and having a Young's modulus of less than or equal to about 10 MPa; and a transparent high-hardness layer 130. In certain embodiments, the transparent high-hardness layer 130 may be sequentially laminated on the transparent high-elasticity layer 120 that is laminated on both sides of the transparent material layer 110 and may have a surface hardness of greater than or equal to a pencil hardness of about 6 H.

Figure 2:
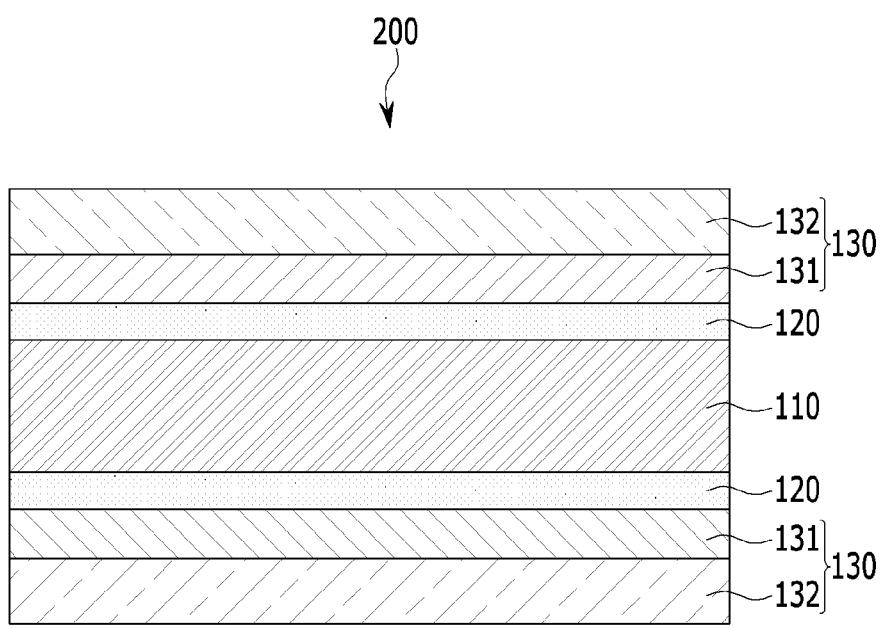
FIG. 2 is a cross-sectional view showing a window panel for a display device according to another aspect of the present embodiments.

FIG. 2 is a cross-sectional view showing a window panel for a display device 200 according to another aspect of the present embodiments.

In certain embodiments, the transparent material layer 110 may be a low-elasticity layer having a Young's modulus of greater than or equal to about 1 GPa. In certain embodiments, the transparent material layer 110 may include a material having a Young's modulus of about 1 GPa to about 20 GPa, but the scope of the present embodiments are not limited to such material and the material may be selected according to the desired physical properties and structure of the structure of the entire window panel for a display device 200.

In certain embodiments, the transparent material layer 110 may include a thermoplastic or thermosetting resin such as polycarbonate (PC), polymethylmethacrylate (PMMA), polystyrene (PS), or a copolymer thereof, polyethyleneterephthalate (PET), polyethylenenaphthalate (PEN), polyethersulfone (PES), an allyl resin, and the like. In certain embodiments, an inorganic material such as glass may be used.

In certain embodiments, the transparent material layer 110 may have a single layer structure of an organic material layer or an inorganic material layer; or a laminating structure where a plurality of organic material layers, a plurality of inorganic material layers, or a combination of an organic material layer and an inorganic material layer are laminated. In certain embodiments, the transparent material layer 110 may have a laminating structure, it may be a composite layer laminated with a Pressure-Sensitive-Adhesive (PSA). For example, a structure may be used that includes a glass fiber material immersed in a resin or a structure where a polyvinylalcohol (PVA) polarizer is laminated with a plastic film.

In certain embodiments, the transparent material layer may have a thickness of about 10 μm to about 2 mm.

In certain embodiments, the transparent high-elasticity layer 120 may be a high-elasticity layer having a Young's modulus of less than or equal to about 10 MPa. In certain embodiments, the transparent high-elasticity layer 120 may have a Young's modulus of about 1 kPa to about 10 MPa. In certain embodiments, the transparent high-elasticity layer 120 may be an adhesive layer, and a so-called Pressure-Sensitive-Adhesive (PSA) may be used. In certain embodiments, the transparent high-elasticity layer 120 may be fabricated by applying an acryl-based resin, α-olefin-based resin, or an urethane-based resin; an ethylene vinyl acetate (EVA)-based resin, an aqueous epoxy-based resin, a cyanoacrylate-based resin, a silicone-based resin, and the like, or a modified type polymer solution on a substrate followed drying, or UV curing without using a solvent. The materials for the transparent high-elasticity layer 120 are not limited to the above-listed materials, and the material for the transparent high-elasticity layer 120 may be selected according to the desired physical properties and structure of the entire window panel for a display device 200.

In certain embodiments, the stress generated from the difference between the coefficients of thermal expansion (CTE) of the layers may be absorbed as the transparent high-elasticity layer 120 is interposed. As shown above, the thickness of the transparent high-elasticity layer 120 may be decided based on the structure of the entire window panel for the display device 200, coefficient of thermal expansion (CTE) of the material of each layer of the panel, used temperature range, hardness of the transparent high-hardness layer 130, and desired physical properties. For example, the thickness of the transparent high-elasticity layer 120 may be in a range of from about 1 μm to about 100 μm. In certain embodiments, the thickness of the transparent high-elasticity layer 120 may range of from about 1 μm to about 100 μm.

According to one embodiment, the transparent high-elasticity layer 120 laminated on both sides of the transparent material layer 110 may have different thickness. In certain embodiments, the vertical symmetrical structure based on the transparent material layer 110 may prevent curling, but in the complete state, the structure may not be symmetrical because an anti-reflective layer (AR) and an anti-fingerprint layer (AF) are further included in the uppermost layer and a touch panel layer, such as an optical clear adhesive (OCA), in the lower layer, and the transparent high-elasticity layer 120 may have a different thickness to protect the entire structure from curling.

In certain embodiments, the transparent high-elasticity layer 120 may be formed to absorb the upper and lower curling stress, the upper transparent high-elasticity layer 120 may be formed to secure hardness and the lower transparent high-elasticity layer 120 may be formed to prevent curling.

In certain embodiments, the transparent high-hardness layer 130 may have a single layer structure of a silsesquioxane layer, which is a material having a high surface hardness, or a laminating structure of the plastic film 131 and the silsesquioxane layer 132, or a laminating structure where one side or both sides of the plastic film 131 is or are laminated with the hard coating layer 132. In certain embodiments, the transparent high-hardness layer 130 having the above structure has a surface hardness of a pencil hardness of about 6 H. According to one embodiment, the transparent high-hardness layer 130 may have a surface hardness of a pencil hardness of about 6 H to a pencil hardness of about 8 H.

In certain embodiments, the silsesquioxane compound that forms the silsesquioxane layer 132 may include a basket type, a trapezoid type, and a random type. According to one embodiment, it may be of a basket type but the scope of the present invention is not limited to it and a combination of a basket type, a trapezoid type, and/or a random type may be used according to desired physical properties. The terms "basket type," "trapezoid type," and "random type" silsesquioxane compound are well known to one of skill in the art.

According to one embodiment, the transparent high-hardness layer 130 may be formed by coating the plastic film 131 with a predetermined silsesquioxane in a predetermined thickness and irradiating with infrared radiation for curing. Additionally, a transparent substrate or a film may be interposed as an oxygen blocking layer to stabilize surface characteristics or a film and stabilize the curing reaction. For example, a basket-type silsesquioxane monomer may be applied to the upper surface of the plastic film 131 along with a photoinitiator. In certain embodiments, the surface of the plastic film 131 may be treated with a primer to improve a close contacting property. During the curing of the silsesquioxane, the close contacting property with the plastic film 131 may be improved to improve the curling hardness of the entire transparent high-hardness layer 130 having a laminating structure of the silsesquioxane 132 and the plastic film 131, and the extent of increase in the hardness of the entire transparent high-hardness layer 130 may be estimated.

In certain embodiments, the plastic film 131 may be a transparent film, such as polyethylene terephthalate (PET), polycarbonate (PC), polymethylmethacrylate (PMMA), and Polyethylene naphthalate (PEN). In certain embodiments, the plastic film 131 may require heat resistance when a reaction temperature is high. In certain embodiments, the plastic film 131 may have a thickness of about 25 μm to about 100 μm. In certain embodiments, the plastic film 131 is laminated facing the transparent high-elasticity layer 120.

In certain embodiments, the coated silsesquioxane layer may be covered with a transparent film (not shown) when an oxygen blocking layer is needed. In certain embodiments, the transparent film may be used as a film for protecting cured silsesquioxane. In certain embodiments, the treatment may be performed in the form of a roll, and thereby high productivity may be secured. In certain embodiments, PET, PMMA, PC, or PEN may be used as the transparent film.

In certain embodiments, the silsesquioxane layer 132 and the hard coating layer 132 may have a thickness of about 5 μm to about 250 μm. In certain embodiments, a single layer of the silsesquioxane layer having the thickness range may be used as a transparent high-hardness layer (a structure 30 of FIG. 1).

In certain embodiments, the silsesquioxane layer alone may be used as the transparent high-hardness layer 130 after it is scaled off from the plastic film 131. Although FIG. 2 shows the transparent high-hardness layer 130 has a laminating structure where the silsesquioxane layer 132 is laminated with the plastic film 131 or hard both sides of the plastic film 131 are laminated with the coating layer 132, the transparent high-hardness layer 130 may also have a single layer of a silsesquioxane layer (which is a structure 30 of FIG. 1).

In certain embodiments, the hard coating layer 132 may include an organic compound or an organic/inorganic composite compound, and the organic compound may include an acryl-based compound, an epoxy-based compound, or a combination thereof, and the organic/inorganic composite compound may include a silicon compound such as polysilsesquioxane.

Figure 3:
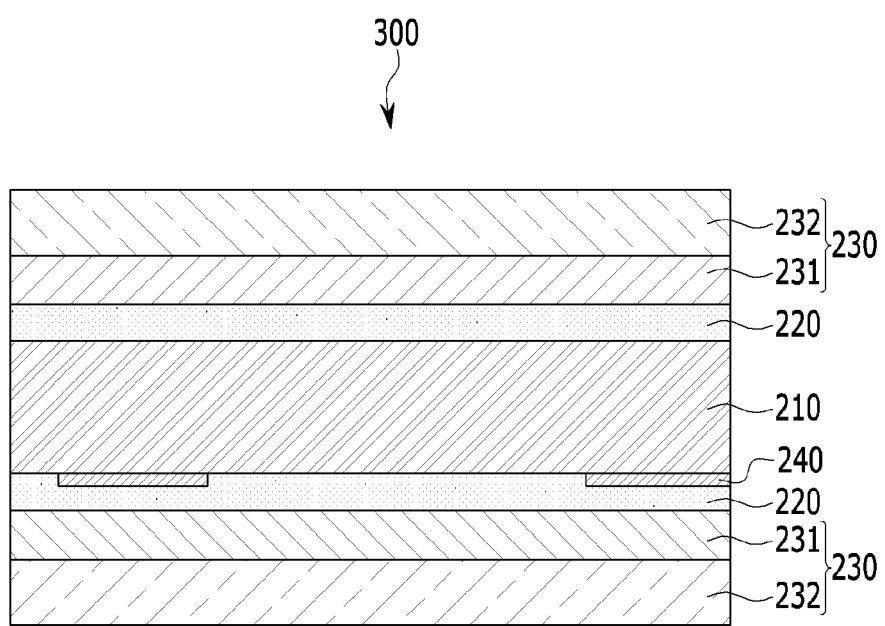
FIG. 3 is a cross-sectional view showing a window panel for a display device according to yet another aspect of the present embodiments.

FIG. 3 is a cross-sectional view showing a window panel for a display device 300 according to yet another aspect of the present embodiments. In certain embodiments, the window panel for a display device 300 may further include a printed unit 240 on one side or both sides of the transparent material layer 210. In certain embodiments, the printed unit 240 includes a design print on a cross section of the transparent material layer 210, for example, a surrounding black mark (BM) or a logo mark may be printed. In certain embodiments, the height of the printed unit 240 ranges from about 10 to about 30 μm, the transparent high-elasticity layer 220 needs to have a thickness as thick as to embrace the thickness of the printed unit 240, which makes the height difference from transparent material layer 210.

In certain embodiments, the printed unit 240 may not be restricted but the printed unit 240 may be formed freely where the window panel for a display device 300 is formed as a transparent material is laminated. According to another embodiment, the window panel for a display device may further include a printed unit on the inner surface of the transparent high-hardness layer facing the transparent material layer.

Figure 4:
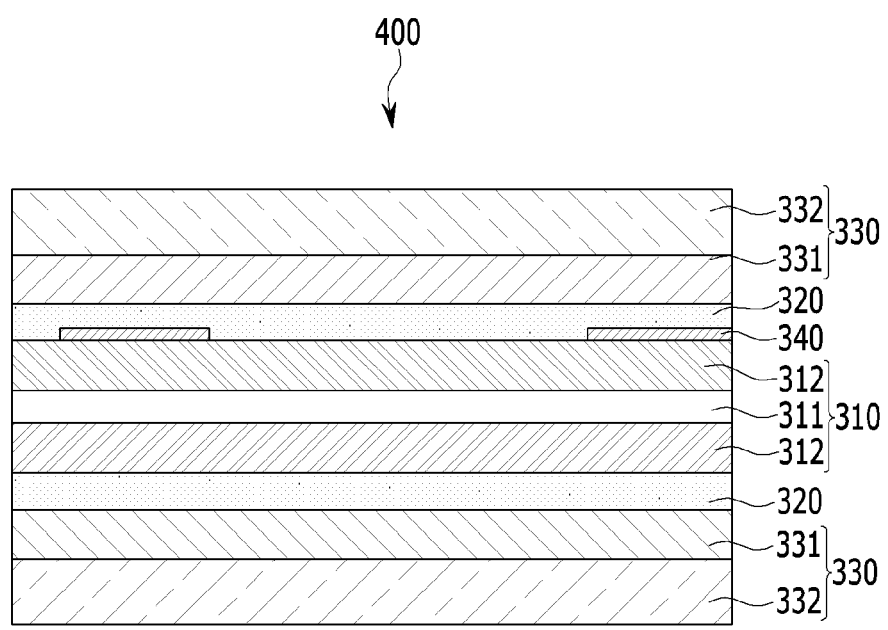
FIG. 4 is a cross-sectional view showing a window panel for a display device according to still another aspect of the present embodiments.

FIG. 4 is a cross-sectional view showing a window panel for a display device 400 according to still another aspect of the present embodiments. In certain embodiments, the window panel for a display device 400 includes a transparent material layer 310 formed of a composite material of a laminating structure. In certain embodiments, the transparent material layer 310 has a structure where the glass fiber material is immersed in a resin, and the plastic film 312 may be laminated with both sides of the glass fiber material 311. In certain embodiments, the transparent material layer 310 may have a structure where the plastic film 312 is laminated with both sides of the polarizer 311. In certain embodiments, a printed unit 340 may be formed by printing the plastic film 312.

In certain embodiments, the transparent high-elasticity layer and the transparent high-hardness layer may be easily formed in a roll type, and they may be formed in roll-to-roll or roll-to-sheet with the transparent material layer, and productivity may be greatly improved, compared with the productivity of forming a cover-window formed of glass or tempered glass.

Some embodiments provide, preparation of a material having adherence, such as an adhesive agent for forming a transparent high-elasticity layer, which is to be mounted on the plastic film side of the completed transparent high-hardness layer. In certain embodiments, the transparent high-elasticity layer material may be applied to form on the surface of an exfoliative film with a material having final properties of smoothness and adhesion in a predetermined thickness and then the transparent high-elasticity layer may be laminated with the plastic film of the transparent high-hardness layer in roll-to-roll. To laminate the transparent high-elasticity layer with the transparent material layer, two sheets of the laminating structure of the transparent high-hardness layer and the transparent high-elasticity layer may be prepared in a roll type, and both sides of a sheet-type or a roll-type transparent material layer may be simultaneously laminated between the two sheets in roll-to-roll or roll-to-sheet. The method is highly productive, and furthermore minimizes the stress between layers. In certain embodiments, both sides of a sheet-type or a roll-type transparent material layer may be laminated sequentially or laminated by cutting each material on the sheet.

In certain embodiments, the window panel may be applied to diverse display devices. In certain embodiments, the display device may include a display module for showing an image and a window panel for protecting the display module. In certain embodiments, the window panel may be disposed on a display module, wherein the display module may be a liquid crystal display module, an organic light emitting display module, a plasma display module, an electric field effect display module, an electrophoresis display module, and the like.

The following Synthesis Examples and Examples illustrate certain embodiments of this disclosure in more detail. These Synthesis Examples and Examples, however, are not in any sense to be interpreted as limiting the scope of this disclosure.

EXAMPLES

Example 1

A window panel for a display device was manufactured having the structure shown in FIG. 2. A transparent high-hardness layer (produced by Nippon Steel Chemical Group (NSCC), Tokyo, Japan) which was a lamination of a silsesquioxane layer (whose product name is Silplus produced by NSCC) of 100 μm and a PET of 50 μm was laminated with an acryl-based transparent adhesive (transparent high-elasticity layer, 10 μm), and then PC was laminated thereon in 200 μm as a transparent material layer. A test sample was manufactured by cutting the resultant lamination with a carbonate gas laser in 150 mm×70 mm.

Example 2

A test sample was manufactured according to the same method as Example 1, except that an acrylic resin of 200 μm was used as a transparent material layer.

Comparative Example 1

A single layer of PMMA was manufactured in 500 μm.

Comparative Example 2

A single layer of an acrylic resin was manufactured in 500 μm.

Evaluation

A steel ball of 130 g was dropped into the middle of the samples manufactured according to Examples 1 and 2 increasing the falling height of the steel ball by 5 cm until damage occurs. The results were shown in the following Table 1.

TABLE 1

|  | Comparative Example 1 | Example 1 | Comparative Example 2 | Example 2 |
|---|---|---|---|---|
| Falling Height (cm) | 10 | 65 | 15 | 55 |

It may be seen from the result that although the single layers of Comparative Examples 1 and 2 may have low impact resistance, the durability may be greatly improved when they have the laminating structures of Examples 1 and 2. Therefore, although a resin having a lower impact resistance than glass was used as the transparent material layer, when the resin has the laminating structure, it may have a hardness as strong as glass.

While this disclosure has been described in connection with what is presently considered to be practical exemplary embodiments, it is to be understood that the embodiments are not limited to the practical exemplary embodiments, but, on the contrary, is intended to cover various modifications and equivalent arrangements included within the spirit and scope of the appended claims.

What is claimed is:

1. A transparent laminate, comprising:
   a transparent material layer having a first surface and a second surface;
   a first transparent elasticity layer laminated directly on the first surface of the transparent material layer, wherein said first transparent elasticity layer has a Young's modulus of less than or equal to about 10 MPa;
   a second transparent elasticity layer laminated directly on the second surface of the transparent material layer, wherein said second transparent elasticity layer has a Young's modulus of less than or equal to about 10 MPa;
   a first transparent hardness layer, wherein said first transparent hardness layer is formed directly on the first transparent elasticity layer, wherein said first transparent hardness layer has a surface hardness of greater than or equal to a pencil hardness of about 6 H; and
   a second transparent hardness layer, wherein said second transparent hardness layer is formed directly on the second transparent elasticity layer, wherein said second transparent hardness layer has a surface hardness of greater than or equal to a pencil hardness of about 6 H.

2. The transparent laminate of claim 1, wherein the transparent laminate is used for a vehicle or a window.

3. A window panel for a display device, comprising:
   a transparent material layer having a first surface and a second surface;
   a first transparent elasticity layer laminated directly on the first surface of the transparent material layer wherein, said first transparent elasticity layer has a Young's modulus of less than or equal to about 10 MPa;
   a second transparent elasticity layer laminated directly on the second surface of the transparent material layer, wherein said second transparent elasticity layer has a Young's modulus of less than or equal to about 10 MPa;
   a first transparent hardness layer, wherein said first transparent hardness layer is formed directly on the first transparent elasticity layer, wherein said first transparent hardness layer has a surface hardness of greater than or equal to a pencil hardness of about 6 H; and
   a second transparent hardness layer, wherein said second transparent hardness layer is formed directly on the second transparent elasticity layer, wherein said second transparent hardness layer has a surface hardness of greater than or equal to a pencil hardness of about 6 H.

4. The window panel of claim 3, wherein the transparent material layer has a single layer structure of an organic material layer or an inorganic material layer; a laminating structure where a plurality of organic material layers, a plurality of inorganic material layer, or a combination of an organic material layer and an inorganic material layer are in a laminated configuration.

5. The window panel of claim 3, wherein the transparent material layer has a Young's modulus of greater than or equal to about 1 GPa.

6. The window panel of claim 3, wherein the transparent material layer has a thickness of about 10 μm to about 2 mm.

7. The window panel of claim 3, wherein the first transparent elasticity layer is an adhesive material layer.

8. The window panel of claim 3, wherein the first transparent elasticity layer has a thickness of about 1 μm to about 100 μm.

9. The window panel of claim 3, wherein the first transparent elasticity layer and the second transparent elasticity layer have the same or different thickness.

10. The window panel of claim 3, wherein the first transparent hardness layer and the second transparent hardness layer have respectively a single layer structure of a silsesquioxane layer; or
    a laminating structure including a plastic film and a silsesquioxane layer; or
    a laminating structure of a plastic film one side or both sides of which is or are laminated with a hard coating layer.

11. The window panel of claim 10, wherein the silsesquioxane layer of the single layer or of the laminating structure has a thickness of about 5 μm to about 250 μm, and
    the hard coating layer of the laminating structure has a thickness of about 5 μm to about 250 μm.

12. The window panel of claim 10, wherein the plastic film of the laminating structure including the plastic film and the silsesquioxane layer or the plastic film of the laminating structure of the plastic film one side or both sides of which is or are laminated with the hard coating layer has a thickness of about 25 μm to about 100 μm.

13. The window panel of claim 10, wherein the hard coating layer includes at least one component selected from the group consisting of an acryl-based compound, an epoxy-based compound, and an organic/inorganic composite compound.

14. The window panel of claim 3, further comprising:
    a first printed unit printed on the first surface of the transparent material layer; and a second printed unit printed on the second surface of the transparent material layer.

15. The window panel of claim 3, further comprising:
    a first printed unit printed on the internal surface of the first transparent hardness layer facing the first surface of the transparent material layer; and a second printed unit printed on the internal surface of the second transparent hardness layer facing second surface of the the transparent material layer.

16. A display device, comprising:
    a window panel for a display device, wherein the window panel comprises:

a transparent material layer having a first surface and a second surface;

a first transparent elasticity layer laminated directly on the first surface of the transparent material layer wherein said first transparent elasticity layer has a Young's modulus of less than or equal to about 10 MPa;

a second transparent elasticity layer laminated directly on the second surface of the transparent material layer, wherein said second transparent elasticity layer has a Young's modulus of less than or equal to about 10 MPa;

a first transparent hardness layer, wherein said first transparent hardness layer is formed directly on the first transparent elasticity layer, wherein said first transparent hardness layer has a surface hardness of greater than or equal to a pencil hardness of about 6 H; and a second transparent hardness layer, wherein said second transparent hardness layer is formed directly on the second transparent elasticity layer, wherein said second transparent hardness layer has a surface hardness of greater than or equal to a pencil hardness of about 6 H.

17. The display device of claim 16, wherein the transparent material layer has a single layer structure of an organic material layer or an inorganic material layer; a laminating structure where a plurality of organic material layers, a plurality of inorganic material layer, or a combination of an organic material layer and an inorganic material layer are in a laminated configuration.

18. The display device of claim 16, wherein the transparent material layer has a Young's modulus of greater than or equal to about 1 GPa.

19. The display device of claim 16, wherein the transparent material layer has a thickness of about 10 µm to about 2 mm.

20. The display device of claim 16, wherein the first transparent elasticity layer is an adhesive material layer.

* * * * *